Nov. 27, 1951  A. O. HANSON  2,576,600
DEVICE FOR GENERATING NEUTRONS
Filed July 3, 1945  3 Sheets-Sheet 1

Witnesses:
Herbert E Metcalf
Paul J. Glaister

Inventor:
Alfred O. Hanson
By Robert A Lavender
Attorney

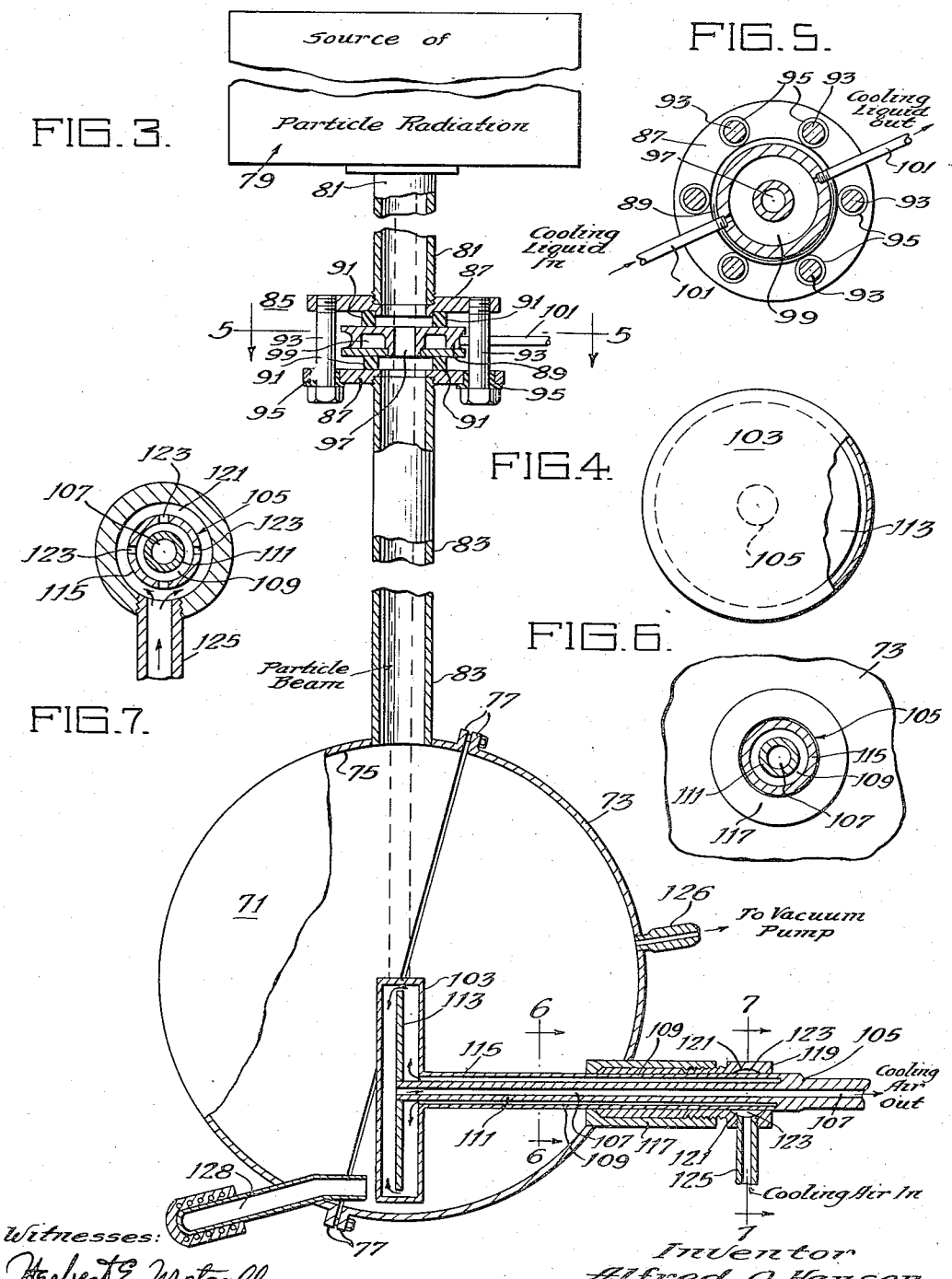

Nov. 27, 1951 — A. O. HANSON — 2,576,600
DEVICE FOR GENERATING NEUTRONS
Filed July 3, 1945 — 3 Sheets-Sheet 3
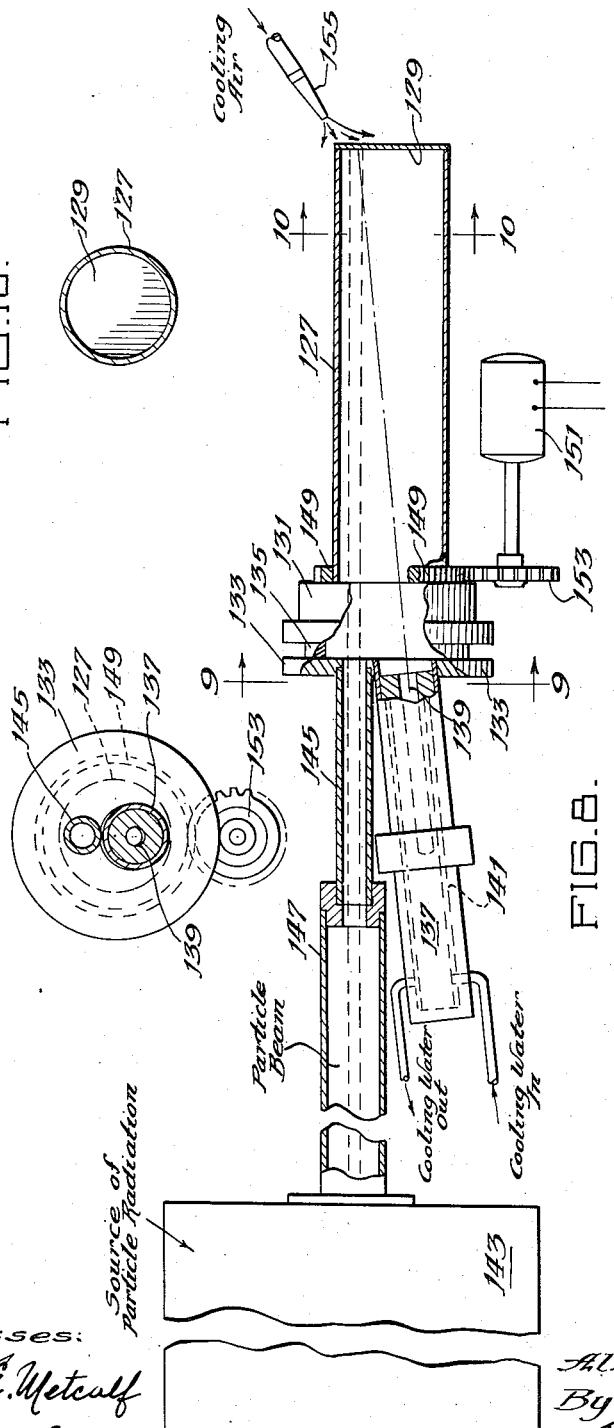
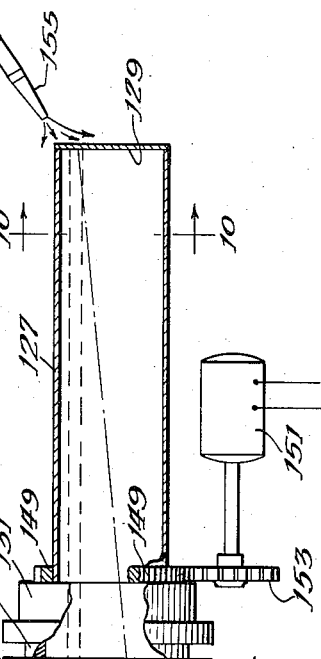

Patented Nov. 27, 1951

2,576,600

UNITED STATES PATENT OFFICE 2,576,600

DEVICE FOR GENERATING NEUTRONS

Alfred O. Hanson, Grand Forks, N. Dak., assignor to the United States of America as represented by the United States Atomic Energy Commission Application July 3, 1945, Serial No. 603,088

22 Claims. (Cl. 250—83.6)

The present invention relates to neutron generators, and particularly to neutron generators utilizing a high energy particle beam and a target of a nuclear disintegrable material arranged to be bombarded by the beam particles.

In the carrying out of various experimental and test procedures in the field of nuclear physics, it is necessary to subject various materials to neutron irradiation. This requires a neutron source, and since many of these procedures involve a substantial time element, it is highly desirable to have available a neutron source which will operate at a uniform output level over an extended period of time. The neutron sources heretofore available in the art are conspicuously lacking in this uniform output characteristic, and extreme difficulty has been experienced in the obtaining of accurate, readily reproducible, quantitive measurements by the use of such sources.

The present invention is concerned with the overcoming of this difficulty and has for a principal object the provision of an improved novel neutron source or neutron generator, which will operate at a uniform output level.

As will hereinafter appear this object of the invention is accomplished by the provision of a neutron generator which employs a high energy beam of proton, or other particle radiation, for effecting neutron generation by nuclear disintegration, a target of a material which disintegrates to emit neutrons under the bombardment of these particles, the target being arranged so that only a part of the target area is normally subjected to the particle beam at any one time, and means for continuously moving the target so that various other portions thereof are successively exposed to the beam radiation, overheating of any one part of the target being thereby prevented. The apparatus also includes means for uniformly coating the rotating target with a very thin, uniform layer of disintegrable material preliminary to the operation of the apparatus as a neutron generator. The various novel features and advantages of the invention will be made more apparent in the following description and the accompanying drawings of certain illustrative embodiments thereof.

In the drawings:

Fig. 3 is a sectional view, generally similar to Fig. 1, illustrating a modified form of the invention;

Fig. 4 is a front elevational view, partially in section, of the rotating, drum type target element constituting a part of the neutron generator illustrated in Fig. 3;

Figs. 5, 6 and 7 are sectional views taken on the lines 5—5, 6—6, and 7—7, respectively, of Fig. 3;

Fig. 8 is a sectional view, partly in elevation, of a second modified form of the invention; and Figs. 9 and 10 are sectional views taken on the lines 9—9 and 10—10, respectively, of Fig. 8.

Figure 1:
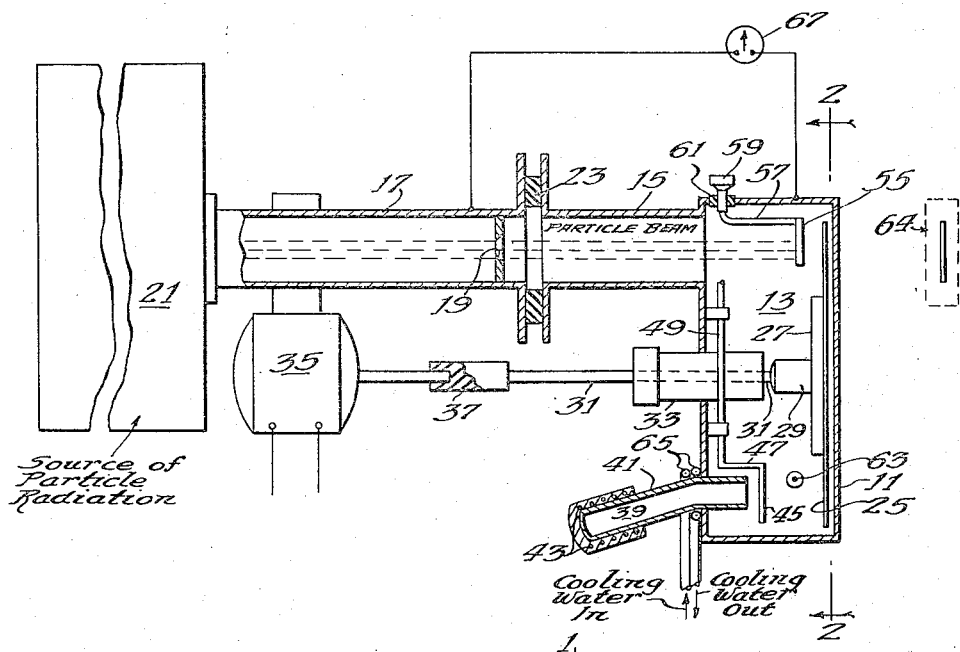
Fig. 1 is a sectional view taken on line 1—1 of Fig. 2, partially in elevation and parts being broken away, through a neutron generator constructed in accordance with the invention.

The particular embodiment of the invention illustrated in Fig. 1 includes a main closure 11 which may be rectangular in outline, as illustrated, or of other convenient shape, and within which is disposed a rotating target structure 13. The main closure 11 may be constructed most conveniently of brass or steel. A flanged tubular member 15 connects with the upper end of the main closure 11 for admitting the beam of particle radiation and with a second flanged tubular member 17, which contains a collimating orifice 19 between the tubular member 15 and the particle beam source 21, which in this embodiment of the invention is a proton beam source. Any source of sufficiently high energy proton particle radiation to effect nuclear disintegration or fission in the target material may be used, and the beam source 21 is accordingly not illustrated in detail. The two tubular members 15 and 17 are in axial alignment and they are connected together by a gas tight, insulating seal 23.

The rotating target structure 13 includes a flat disk 25 of metal, preferably tantalum, which in the particular embodiment of the invention illustrated, is approximately $\tfrac{1}{16}''$ thick and approximately 6'' in diameter. The target disk 25 is supported for rotation within the main closure 11 by means of a circular support plate 27 having an integral hub 29 which is keyed to a suitable shaft 31. The shaft 31 is supported on the main closure 11, in proper position, by means of a seal and bearing means indicated generally at 33. The seal and bearing means 33 should be capable of providing a gas tight seal for the target shaft 31, and any of the known types of bearing seals may be used.

The target shaft 31 is connected to a suitable, slow speed, drive motor 35 by means of an insulated coupling 37. In this particular embodiment of the invention, the target disk 25 is rotated at a speed of approximately 10 revolutions per minute during normal operation of the device.

It has been found preferable, for various reasons, to utilize a target which comprises a support means of material which is relatively stable under bombardment of the particle beam and which is coated with a very thin layer of nuclear disintegrable or fissionable material, rather than a target which is constructed in its entirety of the fissionable material. The material of which the support means is made is otherwise not particularly critical. A metal, such as tantalum, which is relatively unaffected by the atomic particle bombardment of the beams commonly utilized to produce neutrons is particularly suitable.

The coating material used will, of necessity, be determined by the particular type particle radiation employed for effecting reaction therein. For example, if a proton beam is used, as in the embodiment illustrated in Fig. 1, the coating may conveniently comprise lithium. Lithium atoms under proton bombardment capture a proton, emit a neutron, and are converted to the same weight isotope of beryllium. If a deuteron particle beam is used, the coating may be a material such as heavy paraffin, which includes deuterium in its atomic structure, and if an alpha particle beam is used, beryllium is a suitable coating material. All three of these materials are good neutron emitters when subjected to high energy particle bombardment of the character stated.

In order to coat the target disk 25 with a thin uniform coating of reacting material, lithium metal in this particular instance, the apparatus includes an evaporating oven 39 which is operable to introduce lithium vapor into the interior of the main closure 11. The oven 39 may conveniently comprise an elongated, tubular member 41 of steel, which is closed at its lower end and which extends into the main closure 11 at its upper end. The upper end of the tubular member 41 is open, and an electrical heater element 43 is disposed about the lower end of that member, as illustrated. During the operation of the evaporating oven 39, a quantity of lithium metal will be placed in the bottom of the oven member 41. This metal will then be heated by energization of the electrical heating element 43 to effect slow vaporization thereof, and the liberated metallic vapor will be conducted into the interior of the main closure 11 through the open upper end of the member 41. Within the closure 11, the lithium vapor will condense on the various exposed surfaces including the surface of the target disk 25.

Figure 2:
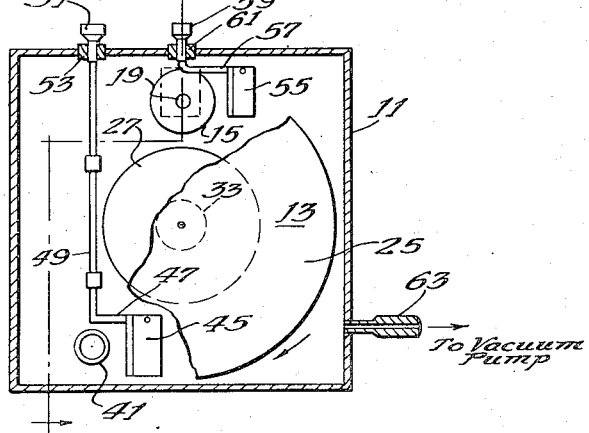
Fig. 2 is a sectional view, partially in end elevation, parts being broken away, taken on the line 2—2 of Fig. 1.

In order to obtain a coating of the greatest possible uniformity, it is desirable that the target disk 25 shall be shielded from the outlet of the evaporating oven 39 during the initial warming-up of the oven. This can be conveniently accomplished by the use of a baffle member 45 which is supported upon an arm 47 integrally attached to a rotatable shaft 49 contained within the main closure. The baffle 45 is adapted to be moved in front of the oven outlet as illustrated in Fig. 1, or to one side as illustrated in Fig. 2, by means of an operating knob 51 which connects with the baffle support shaft 49 through a suitable rotatable seal 53.

It is also desirable that the apparatus shall include means for interrupting the particle beam without requiring the closing down of the beam source. When a proton beam is being used, this may be conveniently accomplished by the use of a quartz shield plate 55, supported by means of an arm 57 and a rotatable operating knob 59 which is integrally attached to the arm 57 as illustrated. A rotatable seal 61, similar to the seal 53 used in the operating means for the oven baffle 45, is also provided. By this arrangement, the shield plate 55 can be moved to the positions shown in Fig. 1 and Fig. 2 so as, in effect, to turn the beam off or on, as may be desired.

Both during the coating of the target disk 25 and during the normal operation of the apparatus, it is necessary that the highest possible vacuum be maintained within the main closure 11. Pressures of the order of from $10^{-4}$ to 0 mm. of mercury have been found satisfactory in instances where lithium is disintegrated by a proton beam. A suitable connection 63, whereby the interior of the main closure 11 may be connected to a vacuum pump, is provided.

When the apparatus is being put into operation, the first step will, of necessity, involve the mechanical connection of the main closure 11 to the proton beam source 21, the aligning of the tubular elements 15 and 17 which admit the beam to the main closure 11, and the sealing of all connections to obviate any leaks in the system. After this has been done, the main closure 11 and those parts of the proton source 21 which are in communication therewith are evacuated to the desired degree of vacuum. When evacuation of the closure has been accomplished, the evaporating oven 39 for the coating material should be heated to the proper temperature. In the case of lithium, this is about a dull red heat. During the warm up period of the evaporating oven 39, it is desirable that the baffle 45 which covers the outlet of the oven shall be in place, and it may also be found desirable to start the rotation of the target disk 25 at this time.

As soon as the oven 39 has reached full heat and has become stabilized, the baffle 45 covering the oven outlet should be moved to one side, in order that the metallic vapor emerging from the oven may freely contact the target disk 25. It is very desirable that the target disk 25 shall be rotated at about its normal speed of 10 R. P. M. during the coating period. Experience indicates that a uniform coating of lithium of proper thickness, about 3 to 5 microns, can be applied to a tantalum disk of the dimensions described above in from 2 to 5 hours' operation of the evaporating oven 39. The considerable period involved in the coating operation assures the maximum possible uniformity in the coating. As soon as a coating of the desired thickness has been applied to the target disk 25, the apparatus is ready to be operated as a neutron generator. The material to be subjected to neutron irradiation may be positioned as indicated at 64.

In view of the extended period required for the coating of the target disk 25, it is desirable to cool the neck of the oven in order to prevent undue heating of the main closure 11. This may be conveniently accomplished by placing one or more turns 65 of copper tubing around the neck of the oven tube 41 at the point where it enters the main closure 11 and circulating water or other suitable coolant therethrough.

During the operation of the apparatus as a neutron generator, the target disk 25 is rotated slowly at uniform speeds of the order of 5 to 25 R. P. M., 10 R. P. M. being considered particularly satisfactory for lithium coated disks of the character previously described. The collimated beam of high intensity proton radiation produced by the source 21 is arranged to impinge upon a portion of the lithium coated inner surface of the target disk 25, adjacent the outer periphery thereof, and the beam may be turned on or off at will by operation of the quartz shield 55. When the proton beam strikes the lithium coated target disk 25, the nuclear reaction induced in the lithium results in the production of substantial quantities of neutrons, as previously described. The relative dimensions of the beam and the target disk 25 are such that only a portion of the surface area of the disk is contacted by the beam at any one time, and the rotation of the disk successively moves other portions of the surface area thereof into the beam. This prevents overheating of any one portion of the target, and is an important feature of the invention. Extended tests on an apparatus of this type have shown that the neutron output of the device is substantially constant over long periods of time. Single runs of as much as 150 hours involving proton currents of the order of 2 microamperes have been made without any observable variation in the neutron output. This is in marked contrast to the operational characteristics of the prior known devices which, almost without exception, exhibit a sharp and non-uniform decrease in the neutron output as the period of bombardment progresses. The proton beam current, which can be used as a measure of the neutron output, may be conveniently metered by the use of a microammeter 67 connected as illustrated.

In certain instances, apparatus of the type previously described will not produce as large an output as may be desired without excessive heating of the target disk 25 despite the continual movement of that disk. To overcome this, the present invention contemplates the use in instances where large neutron outputs are desired of a target structure which embodies separate, forced cooling means, and a structure of this type is included in the apparatus illustrated in Fig. 3.

Specifically the Fig. 3 apparatus includes a main closure 71 of steel or brass which is spherical in shape and is fabricated from two half sections 73 and 75, provided with flanges 77 in order that they may be bolted together to provide a gas tight enclosure. A suitable source of particle beam radiation of any desired character is indicated at 79, and this source is connected to the main closure through a pair of tubular members 81 and 83 and a liquid cooled, collimating orifice means 85.

The orifice means 85 consists of a pair of bolt flanges 87 one of which is screwed on to each of the tubular members 81 and 83, and an annularly shaped, hollow orifice unit 89 adapted to be held between the two flanges 87 by annular, insulating and seal rings 91 as illustrated. Uniformly spaced bolts 93 are provided for clamping the flanges 87 against the seal rings 91 so as to provide gas tight seals, and to permit metering of the beam current during use of the apparatus, these bolts 93 should be insulated from at least one of the flanges 87 by suitable insulating members, such as are illustrated at 95. The annular seal rings 91 which are of insulating material and are disposed intermediate the orifice unit 89 and the flanges 87 serve to insulate that unit. The orifice unit 89 has a cylindrical opening 97 in the center thereof for collimating and for limiting the size of the particle beam, and is provided with an annularly shaped passageway 99 through which a cooling liquid may be circulated, the liquid being conducted thereto by means of suitable inlet and outlet conduits 101.

The target structure in this embodiment of the invention comprises essentially a squat, hollow cylinder or drum 103 which is constructed of tantalum or other suitable material and which is supported for rotation about its longitudinal axis in such manner that the collimated particle beam from the source 79 will strike the periphery of the drum target 103 as it is rotated. The structure illustrated also includes a support shaft 105, preferably of steel, having a central passageway 107 extending entirely therethrough and an annular passageway 109, concentric with the central passageway 107, but extending only part way along the length of the shaft. The inner section 111 of the shaft 105 supports a flat, circular disc 113 having a central opening for receiving the shaft end. The disc 113 is disposed centrally within the target drum 103, and the drum is connected to the outer section 115 of the shaft 105 as illustrated.

A bearing and gland seal 117 of conventional design is provided for supporting the target structure for rotation within the main closure 71. The gland element 119 of the seal 117, as is shown particularly in Fig. 7, is provided with an internal, annular groove or passageway 121 which is adapted to connect with spaced holes 123 provided in the outer section 115 of the shaft 105. A suitable inlet pipe 125 is screwed into the bland element 119, and connected with the annular passageway 121 therein as illustrated.

It will be apparent that air or other cooling medium can be caused to flow through the inlet pipe 125, into the annular passageway 121 within the gland element 119, thence through the holes 123 into the annular passageway 109 provided between the two shaft sections 111 and 115, thence around the interior of the target drum 103 and finally through the central passageway 107 within the shaft 105 to a suitable vent, not shown. A connection for a vacuum pump for use in evacuating the main closure 71 and the associated apparatus is provided at 126, as illustrated. The outboard end of the shaft 105 is mechanically connected to a suitable drive motor, not shown, in order that the target structure may be rotated during the operation of the apparatus. This motor may be similar to the motor illustrated at 35 in Fig. 1.

The operation of this embodiment of the invention and the procedure followed in coating the exterior of the rotating target drum 103 with the necessary film of nuclear disintegrable material are substantially the same as in the structure previously described. An electrically heated evaporating oven 128 similar in construction to the oven 39 is provided for evaporating the coating material and, as in the previously described instance, the target should be rotated during the coating operation. The highest possible degree of vacuum should be maintained within the main closure 71 and the associated parts of the beam source 79 during the coating period and during normal operation of the apparatus. A baffle for use in connection with the oven 128 and a shield for interrupting the particle beam, similar to the baffle 45 and shield 55, have not been illustrated, but it will be understood that these can be included in the apparatus if necessary. The greatest advantage of the drum type target construction is that it makes possible substantially increased neutron output. This results from the fact that a drum type target can be readily adapted to forced, internal cooling, which permits the use of higher intensity particle beams, with resultant increase in neutron output, without undue heating of the target.

It is not essential that the particle beam shall impinge upon the rim of the drum target, although that arrangement is preferred due to the somewhat more efficient cooling possible in that area.

The apparatus illustrated in Figs. 8, 9, and 10 is also, in principle, similar to the Fig. 1 apparatus. The chief distinction between the two devices is that in the Fig. 8 construction the target comprises a portion of the main closure, and the main closure in its entirety is rotated during the operation of the apparatus.

More specifically, the structure illustrated in Figs. 8, 9 and 10 includes a main closure 127 which is substantially cylindrical in form and which is closed at one end by a flat disk 129 of tantalum, or other suitable material, which serves when coated as the target. The other end of the main closure 127, which is open, fits into a rotatable, bearing seal 131, of any suitable design, which is supported upon a flange frame member 133 by means of a ring insulator 135. An evaporating oven 137 for the coating material is sealed into the flange 133 in such manner that the outlet passage 139 provided therein will connect with the interior of the main closure 127. In this connection, the evaporating oven 137 is preferably jacketed with a suitable double wall jacket 141 through which a cooling liquid may be circulated.

The particle beam source, indicated at 143, is connected to the main closure 127 by means of a pair of tubular members 145 and 147 which are sealed together so as to provide a gas tight closure from the frame flange 133 to the beam source 143.

The relative location and arrangement of the parts are such that the particle beam will impinge upon the target disk 129 adjacent the periphery thereof. A gear 149 is keyed to the main closure 127 adjacent the bearing seal 131, and the apparatus includes a suitable motor 151 and drive gear 153 for cooperating therewith, in order that the main closure 127 and the target disk 129 may be rotated during the operation of the apparatus.

The coating of the target disk 129 and the operation of this embodiment of the invention as a neutron generator are also quite similar to the Fig. 1 and the Fig. 3 constructions. Following evacuation of the main closure 127, the tubular conduits 145 and 147, and the communicating portions of the beam source 143, the target disk 139 is coated by operation of the evaporating oven 137 for the necessary period of time, the closure 127 and target disk 129 being slowly rotated during this period. After the target disk 129 is coated, the apparatus may be operated as a neutron generator by the activation of the beam source 143 so as to cause a collimated particle beam from that source to impinge upon the coated target 129. As in the other embodiments of the invention, it is necessary to maintain a very high degree of vacuum within the target chamber during the coating operation and during the operation of the apparatus as a neutron generator. Only a small portion of the target surface is contacted by the particle beam at any one time, and the continual rotation of the closure 127 moves other portions of the target surface successively into contact with the beam. Overheating of the target 129 is avoided and uniform neutron output thereby results. If desired, the target 129 may be force cooled, as by directing an air jet thereon by means of a suitable nozzle such as is illustrated at 155. Any suitable combination of particle beam and nuclear disintegrable material, as described above, can be used.

The apparatus described in the foregoing embodies principles which are new in the construction of neutron generators. These principles make possible neutron generator apparatus which is capable of operating at a uniform output over an extended period of time. The invention has been carefully tested and has proven of great utility. The features of the invention which are believed to be new are expressly set forth in the accompanying claims.

What is claimed is:

1. In apparatus of the class described, means providing a beam of high energy particle radiation, a target which comprises a hollow, drum shaped member having at least the exterior surface thereof constructed of a material which emits neutrons under bombardment of said particle beam, means supporting said target in such manner that only a portion thereof is exposed to said beam at any one time, and means for effecting relative movement between said beam and said target so that differing portions of said target are successively exposed to said beam, coating means mounted adjacent to the exterior surface of the target for coating the surface of said target with a thin coating of material which emits neutrons under bombardment of said particle beam, and means for causing the flow of a cooling medium into and through said drum to effect forced cooling of said target.

2. In apparatus of the class described, means providing a beam of high energy particle radiation, a target which comprises a hollow, generally cylindrical, drum shaped member having at least the exterior surface thereof of a material which emits neutrons under bombardment of said particle beam, means rotatably supporting said target in such position that only a portion of the exterior surface thereof is exposed to said beam at any one time, means for rotating said target during the operation of said apparatus so that differing portions of said target are successively exposed to said beam, coating means mounted adjacent to the exterior surface of the target for coating the surface of said target with a material which emits neutrons under bombardment by the particle beam, and means for causing the flow of a cooling medium into and through said drum to effect forced cooling of said target.

3. In apparatus of the class described, means providing a beam of high energy particle radiation, target means positioned in the path of said beam, said target means being of such dimensions that only a portion of the surface thereof is exposed to said beam at any one time, means for effecting relative movement between said beam and said target means so that differing portions of the surface thereof are successively exposed to said beam, and a coating source adjacent said target means for coating the surface of said target means with a thin coating of a material which emits neutrons under bombardment of said particle beam, preliminary to the operation of said apparatus as a neutron generator.

4. In apparatus of the class described, means providing a beam of high energy particle radiation, a rotatably supported target means positioned in the path of said beam, said target means being of such dimensions that only a portion of the surface thereof is exposed to said beam at any one time, means for rotating said target means during the operation of said apparatus so that differing portions of the surface thereof are successively exposed to said beam, and a coating source adjacent said target means for coating the surface of said target means with a thin coating of a material which emits neutrons under bombardment of said particle beam, preliminary to the operation of said apparatus as a neutron generator.

5. In apparatus of the class described, means providing a beam of high energy particle radiation, target means positioned in the path of said beam, said target means being of such dimensions that only a portion of the surface thereof is exposed to said beam at any one time, means for effecting relative movement between said beam and said target means so that differing portions of the surface thereof are successively exposed to said beam, a coating source adjacent said target means for coating the surface of said target means with a thin coating of a material which emits neutrons under bombardment of said particle beam, preliminary to the operation of said apparatus as a neutron generator, and means for effecting forced cooling of said coated target means.

6. In apparatus of the class described, means providing a beam of high energy particle radiation, a rotatably supported target means positioned in the path of said beam, said target means being of such dimensions that only a portion of the surface thereof is exposed to said beam at any one time, means for rotating said target means during the operation of said apparatus so that differing portions of the surface thereof are successively exposed to said beam, a coating source adjacent said target means for coating the surface of said target means with a thin, uniform coating of a material which emits neutrons under bombardment of said particle beam, preliminary to the operation of said apparatus as a neutron generator, and means for effecting forced cooling of said coated target means.

7. In apparatus of the class described, means providing a beam of high energy particle radiation, a target which comprises a rotatably supported flat disk of a material which is relatively stable under bombardment of said particle beam, said target disk being positioned in the path of said beam and being of such dimensions that only a portion of the surface thereof is exposed to said beam at any one time, means for rotating said target disk during the operation of said apparatus so that differing portions of the surface thereof are successively exposed to said beam, a coating source adjacent said target for coating the surface of said target disk with a thin, uniform coating of a material which emits neutrons under bombardment of said particle beam, preliminary to the operation of said apparatus as a neutron generator, and means for causing the flow of a cooling medium across said target so as to effect forced cooling thereof.

8. In apparatus of the class described, means providing a beam of high energy particle radiation, a target which comprises a rotatably supported, hollow, drum shaped member which is positioned in the path of said beam and which is of such dimensions that only a portion of the surface thereof is exposed to said beam at any one time, means for rotating said target during the operation of said apparatus so that differing portions of the surface thereof are successively exposed to said beam, a coating source adjacent said target for coating the surface of said target drum with a thin uniform coating of a material which emits neutrons under bombardment of said particle beam, preliminary to the operation of said apparatus as a neutron generator, and means for causing the flow of a cooling medium into and through said drum to effect forced cooling of said target.

9. In apparatus of the class described, means defining the walls of a gas tight closure within which a high vacuum is maintained during the operation of said apparatus, means for directing a beam of high energy particle radiation into said closure, target means which comprises a rotatably supported, hollow, drum shaped member which is positioned in the path of said beam within said closure, at least the exterior surface of said drum member being of a material which emits neutrons under bombardment of said particle beam and being of such dimensions that only a portion of the surface area thereof is exposed to said beam at any one time, means for rotating said drum member during the operation of said apparatus so that differing portions of the surface thereof are successively exposed to said beam, coating means mounted within the closure adjacent to the exterior surface of the target means for coating the surface of said target means with a material which emits neutrons under bombardment of the particle beam, and means for causing the flow of a cooling medium into and through said drum member to effect forced cooling thereof.

10. In apparatus of the class described, means defining the walls of a gas tight closure within which a high vacuum is maintained during the operation of said apparatus, means for directing a beam of high energy particle radiation into said closure, target means positioned in the path of said beam, said target means being of such dimensions that only a portion of the surface thereof is exposed to said beam at any one time, means for effecting relative movement between said beam and said target means so that differing portions of the surface thereof are successively exposed to said beam, and a coating means mounted adjacent to the target means for coating the surface of said target means with a thin coating of a material which emits neutrons under bombardment of said particle beam, preliminary to the operation of said apparatus as a neutron generator.

11. In apparatus of the class described, means defining the wall of a gas tight closure within which a high vacuum is maintained during the operation of said apparatus, means for directing a beam of high energy particle radiation into said closure, target means comprising a hollow, drum member which is positioned in the path of said beam and which is of such dimensions that only a portion of the surface area thereof is exposed to said beam at any one time, means including a hollow shaft which extends through the walls of said closure for rotatably supporting said drum member, means external of said closure for rotating said hollow shaft and said drum member during the operation of said apparatus, so that differing portions of the surface of said drum member are successively exposed to said beam, means including an evaporating oven which opens into said closure for coating the surface of said target drum with a thin uniform coating of a material which emits neutrons under bombardment of said particle beam, preliminary to the operation of said apparatus as a neutron generator, and means for causing the flow of a cooling medium into and through said drum member via said hollow shaft to effect forced cooling of said target.

12. In apparatus of the class described, means defining the walls of a gas tight closure within which a high vacuum is maintained during the operation of said apparatus, means for directing a beam of high energy particle radiation into said closure and against the inner surface of one of the walls thereof, said wall surface being of a material which emits neutrons under bombardment of said particle beam and being of such dimensions that only a portion of the area thereof is bombarded by said beam at any one time, coating means mounted adjacent to the wall bombarded by radiation for coating said wall with a material which emits neutrons under bombardment by said radiation, and means for effecting relative movement between said beam and said wall surface so that differing portions of said wall surface are successively bombarded by said beam.

13. In apparatus of the class described, means defining the walls of a gas tight closure within which a high vacuum is maintained during the operation of said apparatus, means for directing a beam of high energy particle radiation into said closure and against the inner surface of one of the walls thereof, said wall surface being of a material which emits neutrons under bombardment of said particle beam and being of such dimensions that only a portion of the area thereof is bombarded by said beam at any one time, means for effecting relative movement between said beam and said wall surface so that differing portions of said wall surface are successively bombarded by said beam, coating means mounted adjacent to the wall bombarded with particle radiation for coating said wall with a material which emits neutrons under bombardment by said radiation, and means for effecting forced cooling of the said wall surface which is subjected to bombardment by said beam.

14. In apparatus of the class described, means defining the walls of a gas tight closure within which a high vacuum is maintained during the operation of said apparatus, means for directing a beam of high energy particle radiation into said closure and against the inner surface of one of the walls thereof, said wall surface being of such dimensions that only a portion of the area thereof is bombarded by said beam at any one time, means for effecting relative movement between said beam and said wall surface so that differing portions of said inner wall surface are successively bombarded by said beam, and means including an evaporating oven, which opens into said closure, for coating said inner wall surface with a thin, uniform coating of a material which emits neutrons under bombardment of said particle beam, preliminary to the operation of said apparatus as a neutron generator.

15. In a generator of particle radiations, a vacuum-tight chamber, a target member within the chamber, means for directing a beam of particle radiations against the target member, and a coating source of a material emitting other particle radiations upon bombardment by the first said particle radiations mounted adjacent to the target member within the chamber, whereby the coating of the target member may be renewed without opening the chamber.

16. The apparatus of claim 15 wherein said beam of particle radiations impinges on only a portion of said target member, and there are provided motive means to continuously change the portion of the target member on which the beam impinges.

17. The apparatus of claim 16 wherein the target member is a heat-resistant rotating disc and the beam impinges thereon at a point adjacent the periphery thereof.

18. The apparatus of claim 16 wherein the target member is a rotating drum, and the beam impinges thereon at a point on the edge thereof.

19. The apparatus of claim 16 wherein the target member comprises at least a portion of the wall of the chamber.

20. The apparatus of claim 15 wherein the coating source comprises a receptacle for a vaporizable target substance and heating means adjacent said receptacle for vaporizing such substance.

21. The apparatus of claim 15 wherein there are provided a removable shield between the beam means and the target member and a removable baffle adjacent the coating source.

22. In a generator of neutrons, a vacuum-tight chamber, a target member within the chamber, means for directing a beam of particle radiations against the target member, and a coating source of a material emitting neutrons upon bombardment by the first said particle radiations mounted adjacent to the target member within the chamber, whereby the coating of the target member may be renewed without opening the chamber.

ALFRED O. HANSON.

REFERENCES CITED

The following references are of record in the file of this patent:

UNITED STATES PATENTS

| Number | Name | Date |
|---|---|---|
| 2,030,561 | Andrew | Feb. 11, 1936 |
| 2,075,146 | Sergeeff | Mar. 30, 1937 |
| 2,215,155 | Kallmann et al. | Sept. 17, 1940 |

FOREIGN PATENTS

| Number | Country | Date |
|---|---|---|
| 491,766 | Great Britain | Sept. 8, 1938 |